United States Patent Office 2,959,482
Patented Nov. 8, 1960

2,959,482
LIGHT SENSITIVE MATERIAL

Wilhelm Neugebauer and Oskar Süs, Wiesbaden-Biebrich, and Fritz Endermann, Wiesbaden, Germany, assignors, by mesne assignments, to Azoplate Corporation, Murray Hill, N.J., a corporation of New Jersey No Drawing. Filed Dec. 28, 1955, Ser. No. 556,018

Claims priority, application Germany July 17, 1951

32 Claims. (Cl. 96—33)

This invention relates to the field of photomechanical reproduction. More particularly it pertains to new light-sensitive material suitable for use in photomechanical reproduction and to a process of manufacturing printing plates for use in lithography, planographic printing and the like.

This application is a continuation-in-part of Serial No. 299,014, filed July 15, 1952, now abandoned.

Photomechanical reproduction processes have recently been proposed which do not require that the light sensitive layer contains collodial substances which may be hardened by the action of light. In these processes, either the light sensitive substance itself or its light transformation products are receptive to lithographic ink and capable of retaining the ink for a sufficient length of time under the stress of the reproduction process.

It has now been found that light sensitive material for this purpose can be sensitized with compounds belonging to the category of diazo ketones and conforming to one of the following two general formulae:

$$A-CO-C\diagup^R_{\diagdown N_2}$$

or $$B-CO-C\diagup^{B'}_{\diagdown N_2}$$

in which:

A is a polynuclear aromatic ring system, a heterocyclic ring system or a phenyl residue which is substituted by substituents of the escond order, e.g.

$-NO_2, -SO_2-NHaryl$  $-SO_2-CH_2-CO-C\diagup^H_{\diagdown N_2}$  $CO-aryl$ $-CO-C\diagup^H_{\diagdown N_2}$ and may carry, in addition, substituents of the first order, e.g. halogen, alkyl groups, or alkoxy groups, B, B' are aryl residues or substituted aryl residues, and R is hydrogen or an alkyl residue.

The terms "substituents of the first order" and "substituents of the second order" are used herein in their well known sense as described, for example, by Karrer in his "Lehrbuch der Organischen Chemie" (Textbook of Organic Chemistry) page 435, 9th edition. In said textbook Karrer states substituents of the benzene nucleus called "substituents of the first order" which are primarily saturated groups and which direct another substituent entering the nucleus into the ortho-position or para-position in relation to their own position. Other substituents being usually groups containing double bonds which substituents are called by Karrer "substituents of the second order," usually direct another substituent entering the nucleus into the meta-position.

Diazo ketones which may be used as light-sensitive substances for the production of light sensitive layers in accordance with this invention are, for example, the following compounds:

(1) The diazo ketone of 1-naphthoic acid (melting above 230° C. under decomposition)

$$CO-C\diagup^H_{\diagdown N_2}$$

18 g. of nitroso methyl urea are introduced in portions into a cooled 20% caustic potash or caustic soda solution with a layer of ethyl ether superimposed. An ethereal diazo methane solution is formed which is separated from the solution of caustic alkali, cooled down to 0° C., and then gradually mixed with 1 g. of naphthalene-1-carboxylic acid chloride while agitating. The reaction mixture is agitated for another hour at 0° C., whereupon the precipitating orange-colored diazo-ketone corresponding to Formula 1 is separated by filtration. Yield: 1 g.

(2) The diazo ketone of anthraquinone-2-carboxylic acid (melting above 230° C. under decomposition)

$$\text{[anthraquinone structure]}-CO-C\diagup^H_{\diagdown N_2}$$

Into an ethereal diazone methane solution, which had been prepared according to the method described in connection with the compound of Formula 1 from 18 g. of nitroso methyl urea and then cooled down to 0° C., there are introduced 3 g. of anthraquinone-2-carboxylic acid chloride, while agitating. The reaction mixture is stirred for another hour and then the precipitating yellow-colored diazo-ketone corresponding to Formula 2 is separated by filtration. Yield: 3 g.

(3) The diazo ketone of 2-phenyl-quinoline-4-carboxylic acid (melting at 90° C. under decomposition)

$$\text{[2-phenyl-quinoline structure]}-CO-C\diagup^H_{\diagdown N_2}$$

Into an ethereal diazo methane solution, which had been prepared according to the method described in connection with the compound of Formula 1 from 18 g. of nitroso methyl urea and then cooled down to 0° C., there are gradually introduced 3 g. of 2-phenyl-quinoline-4-carboxylic acid chloride, while agitating. The reaction mixture is agitated for another hour at 0° C. After removing the ether by vacuum evaporation an oil is obtained which solidifies to a light-brown crystalline mass, i.e. the diazo ketone corresponding to Formula 3. Yield: about 3 g.

(4) The diazo ketone of thiophene-2-carboxylic acid (melting at 194° C. under decomposition)

$$\text{[thiophene structure]}-CO-C\diagup^H_{\diagdown N_2}$$

Into an ethereal diazo methane solution, which had been prepared according to the method described in connection with compound 1 from 18 g. of nitroso methyl urea and then cooled down to 0° C., there are gradually introduced, while agitating, 3 g. of thiophene-2-carboxylic acid chloride. The reaction mixture is agitated for another hour and then the light-brown colored diazo-ketone corresponding to Formula 4 is separated by filtration. Yield: 2.3 g.

(5) The diazo ketone of 2-methyl-thiazole-5-carboxylic acid (melting at 85° C. under decomposition)

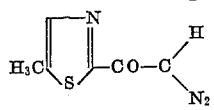

Into an ethereal diazo methane solution, which had been prepared according to the method described in connection with compound 1 from 18 g. of nitroso methyl urea and then cooled down to 0° C., there are gradually introduced, while agitating, 4 g. of 2-methyl-thiazole-5-carboxylic acid chloride. The reaction mixture is agitated for another hour at 0° C. and then the brown diazoketone corresponding to Formula 5 is separated by filtration. Yield: about 1.5 to 2.0 g. An additional gram of the diazo-ketone may be obtained by vacuum evaporation of the ethereal mother lye.

(6) The diazo ketone of 2-nitro-benzoic acid (viscous oil)

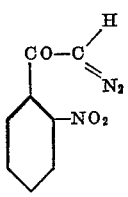

Into an ethereal diazo methane solution, which had been prepared according to the method described in connection with the compound of Formula 1 from 35 g. of nitroso methyl urea and then cooled down to 0° C., there is introduced, drop by drop, an ethereal solution of 10 g. of 2-nitro-benzoyl-chloride, while agitating. The reaction mixture is stirred for another hour at 0° C. By vacuum evaporation of the ethereal solution 9.5 g. of the diazo-ketone corresponding to Formula 6 are obtained in the form of a viscous oil which does not become crystalline.

(7) The diazo ketone of 3-nitro-benzoic acid (melting at 149° C. under decomposition)

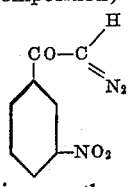

Into an ethereal diazo methane solution, which had been prepared according to the method described in connection with the compound of Formula 1 from 35 g. of nitroso methyl urea and then cooled down to 0° C., there is gradually added, while agitating, an ethereal solution of 19 g. of 3-nitrobenzoyl-chloride. The reaction mixture is stirred for another hour and the light-yellow colored diazo-ketone corresponding to Formula 7 is then separated by filtration. Yield: 12.5 g.

(8) The diazo ketone of 4-nitro-benzoic acid (melting at 119° C. under decomposition)

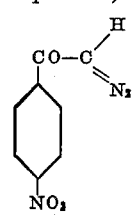

Into an ethereal diazo methane solution, which had been prepared according to the method described in connection with the compound of Formula 1 from 35 g. of nitroso methyl urea and then cooled down to 0° C., there is gradually introduced, while agitating, an ethereal solution of 19 g. of 4-nitrobenzoyl-chloride. The reaction mixture is agitated for another hour at 0° C. and then the light-yellow colored diazo-ketone corresponding to Formula 8 is separated by filtration. Yield: 10 g.

(9) The diazo ketone of 2-methyl-5-nitro-benzoic acid (melting at 112° C. under decomposition)

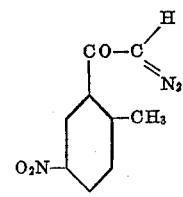

To an ethereal diazo methane solution, which had been prepared from 18 g. of nitroso methyl urea according to the method described in connection with the compound of Formula 1 and then cooled down to 0° C., there are gradually added, while agitating, 4 g. of 2-methyl-5-nitro-benzoic acid chloride. The reaction mixture is stirred for another hour and the precipitating brown diazo-ketone corresponding to Formula 9 is separated by filtration. Yield: 3.5 g.

(10) The diazo ketone of 3-nitro-anisic acid (melting at 140° C. under decomposition)

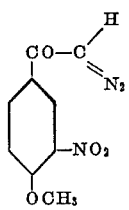

Into an ethereal diazo methane solution, which had been prepared from 18 g. of nitroso methyl urea according to the method described in connection with the compound of Formula 1 and then cooled down to 0° C., there are gradually introduced while agitating 10 g. of 3-nitro-anisic acid chloride. The reaction mixture is agitated for another hour, and then the precipitating light-yellow diazo ketone corresponding to Formula 10 is separated by filtration. Yield: 6 g.

(11) The diazo ketone of 2-chloro-4-nitro-benzoic acid (viscous oil)

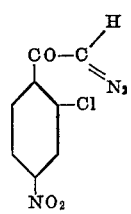

Into an ethereal diazo methane solution, which had been prepared from 18 g. of nitroso methyl urea according to the method described in connection with the compound of Formula 1 and then cooled down to 0° C., there is introduced, while agitating, an ethereal solution of 10 g. of 2-chloro-4-nitro-benzoic acid chloride. The reaction mixture is stirred for another hour at 0° C. After vacuum evaporation of the ether, 10 g. of the diazo ketone corresponding to Formula 11 are obtained in the form of a brown-colored oil, which does not become crystalline.

(12) The diazo ketone of 2,4-dinitro-benzoic acid (melting at 120° C. under decomposition)

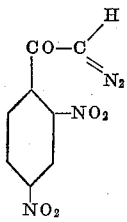

To an ethereal diazo methane solution, which had been prepared from 35 g. of nitroso methyl urea according to the method described in connection with the compound of Formula 1 and then cooled down to 0° C., there is added drop by drop and while agitating an ethereal solution of 23 g. of 2,4-dinitro-benzoyl chloride. The reaction mixture is agitated for another hour at 0° C. and then the light brown-colored diazo ketone corresponding to Formula 12 is separated by filtration. Yield: 10 g.

(13) The diazo ketone of 4-methyl-3,5-dinitro-benzoic acid (melting at 124° C. under decomposition),

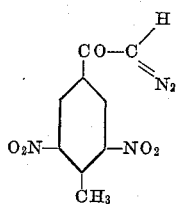

To an ethereal diazo methane solution, which had been prepared from 18 g. of nitroso methyl urea according to the method described in connection with the compound of Formula 1 and then cooled down to 0° C., there are gradually added while agitating 8 g. of 3,5-dinitro-4-methyl-benzoic acid chloride. The reaction mixture is agitated for another hour at 0° C. and then the precipitating light-yellow diazo ketone corresponding to Formula 13 is separated by filtration. Yield: 4 g.

(14) The diazo ketone of β-nitro-phthalic acid (viscous oil),

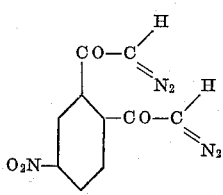

To an ethereal diazo methane solution, which had been prepared from 18 g. of nitroso methyl urea according to the method described in connection with the compound of Formula 1 and then cooled down to 0° C., there is gradually added while agitating an ethereal solution of 6 g. of β-nitro-phthalyl chloride. After the reaction mixture has been agitated for another hour at 0° C., the ether is evaporated in a vacuum. The diazo ketone of the β-nitro-phthalic acid, to which the structural Formula 14 is attributed, is obtained in the form of a brown oil. Yield: 5 g.

(15) The diazo ketone of nitro-terephthalic acid (melting at 118° C. under decomposition),

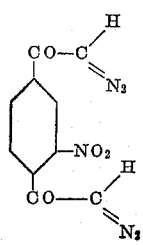

To an ethereal diazo methane solution, which had been prepared from 18 g. of nitroso methyl urea according to the method described in connection with the compound of Formula 1 and then cooled down to 0° C., there are gradually added, while agitating, 6 g. of nitro-terephthalyl chloride. The reaction mixture is agitated for another hour at 0° C. and then the precipitating light-brown diazo ketone corresponding to Formula 15 is separated by filtration. Yield: 3.5 g.

(16) The methyl-diazo ketone of 2-nitro-benzoic acid (melting at 141° C. under decomposition),

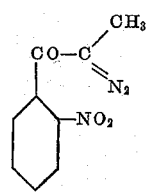

In accordance with the method described by Pechmann in "Berichte der Deutschen Chemischen Gesellschaft," vol. 31, page 2643, an ethereal diazo ethane solution is prepared from 12 g. of N-nitroso-N-ethyl-urethane. To this solution, after cooling it down to 0° C., there is added, drop by drop, an ethereal solution of 4 g. of 2-nitrobenzoyl-chloride. The reaction mixture is stirred for another hour at 0° C. and then the precipitating light-brown colored crystalline methyl diazo ketone corresponding to Formula 16 is separated by filtration. Yield: 1.5 g.

(17) The ethyl-diazo ketone of 2-nitro-benzoic acid (melting at 152° C. under decomposition),

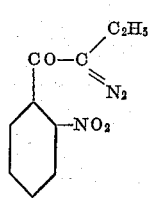

In accordance with the method described by Nirdlinger and Acree in "American Chemical Journal," vol. 43, page 378, an ethereal diazo propane solution is prepared from 12 g. of N-nitroso-N-propyl-carbamic acid ethyl ester. The diazo propane solution is cooled down to 0° C. and then 4 g. of 2-nitro-benzoyl chloride are added in portions, while agitating. The reaction mixture is agitated for another hour and then the precipitating light-brown colored diazo ketone corresponding to Formula 17 is separated by filtration. Yield: 1.5 g.

(18) The methyl-diazo keton of 4-nitro-benzoic acid (melting at 230° C. under decomposition),

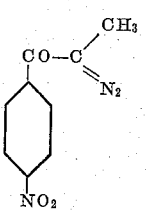

To an ethereal diazo ethane solution prepared from 12 g. of N-nitroso-N-ethyl-urethane according to the method stated in connection with the compound of Formula 16 and cooled down to 0° C., there are added in portions and while agitating 4 g. of 4-nitro-benzoyl chloride. The reaction mixture is agitated for another hour at 0° C. and then the precipitating light-yellow diazo ketone corresponding to Formula 18 is separated by filtration. Yield: 1.1 g.

(19) The methyl-diazo ketone of 2-chloro-4-nitro-benzoic acid (viscous oil),

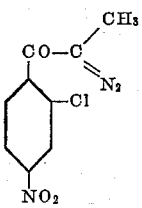

To an ethereal diazo ethane solution prepared from 12 g. of N-nitroso-N-ethyl-urethane according to the method stated in connection with the compound of Formula 16 and cooled down to 0° C., there are gradually added while agitating 5 g. of 2-chloro-4-nitro-benzoyl chloride. The reaction mixture is agitated for another hour at 0° C. and then the ether is evaporated in a vacuum. 4 g. of the diazo ketone corresponding to Formula 19 are obtained in the form of a brown viscous oil.

(20) The diazo ketone of p-sulfanilide-benzoic acid (viscous oil),

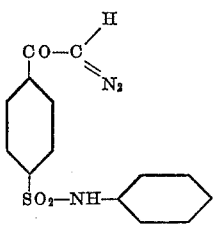

To an ethereal diazo methane solution, which had been prepared from 18 g. of nitroso methyl urea according to the method described in connection with the compound of Formula 1 and then cooled down to 0° C., there are gradually added, while agitating, 6 g. of the carboxylic acid chloride of the p-sulfanilide-benzoic acid. The reaction mixture is agitated for another hour at 0° C. and the ether is subsequently evaporated by vacuum. 5 g. of the diazo-ketone corresponding to Formula 20 are obtained in the form of a yellow oil, which does not become crystalline.

(21) The diazo ketone of benzene-sulfanilide-4,4'-dicarboxylic acid (melting at 200° C. under decomposition),

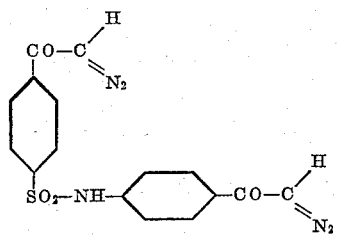

To an ethereal diazo methane solution, which had been prepared from 9 g. of nitroso methyl urea according to the method described in connection with the compound of Formula 1 and then cooled down to 0° C., there are gradually added, while agitating, 1.5 g. of the acid chloride of the benzene-sulfanilide-4,4'-dicarboxylic acid. The reaction mixture is agitated for another hour at 0° C. and then filtered. 1 g. of the light-brown diazo-ketone corresponding to Formula 21 are obtained.

(22) The diazo ketone of 2-carboxy-methyl-sulfone-benzoic acid (viscous oil),

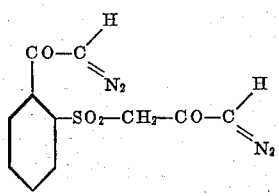

To an ethereal diazo methane solution, which had been prepared from 18 g. of nitroso methyl urea according to the method described in connection with the compound of Formula 1 and cooled down to 0° C., there is gradually added, while agitating, the ethereal solution of 3 g. of the acid chloride of the 2-carboxymethyl-sulfone-benzoic acid. The reaction mixture is agitated for another hour while cooling is continued and the ether is subsequently evaporated by vacuum. 3 g. of a reddish-brown oil are obtained, to which the structural Formula 22 is attributed.

(23) The diazo ketone of phenyl-thio-glycol-2-carboxylic acid (viscous oil),

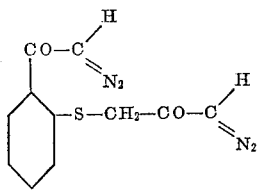

To an ethereal diazo methane solution, which had been prepared from 18 g. of nitroso methyl urea according to the method described in connection with the compound of Formula 1 and cooled down to 0° C., there are added, in portions, and while agitating, 8 g. of the acid chloride of the "phenyl-thioglycol-2-carboxylic acid" (=phenyl-thioglycolic acid-2-carboxylic acid). The reaction mixture is stirred for another hour at 0° C. and the ether is evaporated by vacuum. 7 g. of the diazoketone corresponding to Formula 23 are obtained in the form of a brown-colored viscous oil.

(24) The diazo ketone of 3-thiophenol-1-carboxylic acid (melting at 82° C. under decomposition),

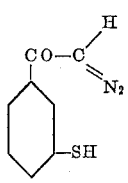

To an ethereal diazo methane solution, which had been prepared from 18 g. of nitroso methyl urea according to the method described in connection with the compound of Formula 1 and cooled down to 0° C., there is added, while agitating, the ethereal solution of 8 g. of 3-thiophenol-1-carboxylic acid chloride. The reaction mixture is agitated for another hour at 0° C. and the ethereal solution is evaporated by vacuum. 8 g. of the diazo-ketone corresponding to Formula 24 are obtained in the form of a brown-colored oil, which solidifies to a crystalline mass.

(25) The diazo ketone of 4-benzoyl-benzoic acid (viscous oil),

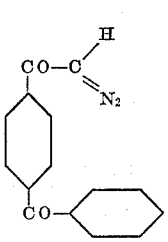

To an ethereal diazo methane solution, which had been prepared from 9 g. of nitroso-methyl urea according to the method described in connection with the compound of Formula 1 and cooled to 0° C., there are added, while agitating, 2 g. of 4-benzoyl-benzoic acid chloride. The reaction mixture is agitated for another hour at 0° C. and the ether is removed by vacuum evaporation. 2 g. of the diazo ketone corresponding to Formula 25 are obtained in the form of a brown-colored viscous oil.

(26) Diazo-desoxy-benzoin (azibenzil) (melting at 63° C. under decomposition),

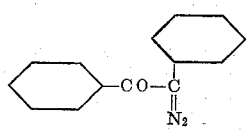

The preparation of this compound (decomposition point 63° C.) is described by Curtius in "Journal fur praktische Chemie," vol. 44 (1891), pages 176–182.

(27) 4,4' - dinitro - diazo - desoxy - benzoin (4,4'-dinitro azibenzil) (melting at 115° C. under decomposition),

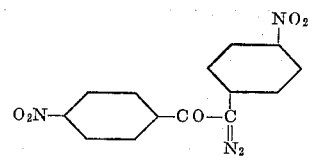

5 g. of 4,4'-dinitrobenzil, prepared according to the method stated by Chattaway and Coulson in "Journal of Chemical Society, London," (1928), pages 1361–1364, are introduced into 50 cc. of ethyl alcohol and then boiled for 15 minutes after adding 1 g. of hydrazine hydrate. When the reaction mixture cools down, the weakly yellow colored mono-hydrazone of the 4,4'-dinitrobenzil crystallizes out. This compound, of the constitution $C_{14}H_{10}O_5N_4$, decomposes at 215–217° C. Yield: 2.5 g.

2 g. of the mono-hydrazone of the 4,4'-dinitrobenzil and 2.5 g. of mercury oxide are agitated for 30 minutes in 50 cc. of benzene at room temperature. The deep orange-colored benzene solution is filtered off from the mercury oxide and the benzene is evaporated at a temperature as low as possible, preferably by blowing air over the solution. 0.7 g. of 4,4'-dinitro-azibenzil corresponding to Formula 27 are obtained, which melts at 115° C. with decomposition.

The diazo ketones conforming to the general formula

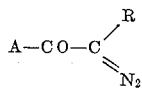

in which R stands for hydrogen or alkyl, to be used in accordance with this invention, can be prepared by the known method of B. Eistert, which is described in the "Zeitschrift für angewandte Chemie" (Journal of applied chemistry), edition 1941, pages 99 ff. and pages 124 ff. (particularly pages 124–127). Diazo ketones conforming to the general formula:

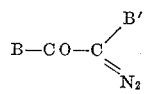

are most suitably prepared by analogy to the method described by T. Curtius and K. Thun in the "Journal für praktische Chemie" (Journal of practical chemistry), volume 44, 1891 edition, see pages 176 and 182, wherein an aromatic 1,2-diketone represented by the formula B—CO—CO—B' (B and B' being as above defined) is used as the starting material.

Light-sensitive material, to be used for the production of images and containing diazo ketones in accordance with this invention, is produced by applying a solution of the diazo ketone to a suitable base material. For the production of printing plates or cliches for the graphical industry, metal, among other materials, can be considered a suitable base, e.g. metal plates, in particular such plates of aluminum, which may be covered by a chemically or electrochemically produced layer of aluminum oxide.

The solution is applied to the base by one of the known methods used for this purpose, for instance by means of a plate whirler. Subsequent to the application of the light-sensitive solution to the base material the coated base is dried.

Instead of applying merely one diazo ketone, mixtures of light-sensitive diazo ketones can also be used to advantage. This applies especially to such cases where the individual compounds show a strong tendency to crystallize when applied to the base. It frequently happens, in consequence, that the originally obtained crude products, which are not purified, are better suited for the production of a uniform light-sensitive layer than the diazo ketones purified by recrystallization.

In the production of the coating solutions it is of advantage to use organic solvents that do not react chemically with the diazo ketone group, e.g. dioxane, benzene, glycol-monomethyl ether. Mixtures of several solvents may also be used advantageously in the preparation of the solution to be applied to the base material.

In order to produce an image, the base, coated with a layer containing a diazo ketone or a mixture of diazo ketones, is exposed to the action of a light image, e.g. to the radiation of an arc lamp or a mercury lamp through a transparent master pattern in contact with the coated surface or to a projected image. Those areas of the layer struck by light are hereinafter referred to as "image areas." The image is then developed; for example, by the removal of the light sensitive layer in those areas not affected by light. Those areas of the layer not struck by light are hereinafter referred to as "non-image areas." For this purpose the coated side of the exposed material is rubbed in with a dilute mineral acid, e.g. phosphoric acid, sulfuric acid, or hydrochloric acid. It may prove of advantage to add to this dilute acid solution, a dilute solution of some metal salt, e.g. copper acetate, copper sulfate, silver acetate or nickel acetate. The development can be effected also by rubbing the coated side of the exposed material with an organic solvent that does not dissolve the light-decomposition product. For example, it may be rubbed with an alcoholic solution of calcium chloride, with benzene, toluene, gasoline or carbon tetrachloride.

Subsequent to its development, the image is inked with greasy lithographic ink in the presence of water, either by hand or on the printing machine. A clear reverse image of the master pattern now appears. It was only indistinctly visible prior to inking. The areas affected by the light rays take the greasy ink, while the ink is repelled in the areas not affected by light.

The manner of formation of the image may possibly be explained by the assumption that the diazo ketone is decomposed by the light rays in those areas of the light-sensitive layer which are exposed to the action of light, the nitrogen of the diazo ketones being split off. Subsequent to the escape of the nitrogen, polymeric products originate from the radical-like intermediate products. The polymeric products differ from the primary material in respect to melting point, solubility and color. In consequence thereof, an image frequently becomes visible subsequent to the exposure to light of the light-sensitive material and, after the exposed foil is developed, the image takes greasy ink. The reverse image of the master used when exposing the light-sensitive material is thus obtained on the base material.

The light-sensitive material produced in accordance with this invention can be stored in unexposed condition at normal room temperature if moisture is excluded, even when metal is used as the base material.

The following examples are inserted with the intention of merely illustrating the invention. If not otherwise stated, the parts are by weight.

*Examples*

(1) The solution of 2 parts of the diazo ketone of p-nitro-benzoic acid (Formula 8) in 100 parts by volume of glycol-monomethyl ether is applied in some known manner, for example by means of a plate whirler, to an aluminum foil, which may be provided with a mechanically roughened surface and is then dried. The coated side of the dry material is exposed to light under a master pattern, for example to an 18-ampere arc lamp for approximately three to five minutes at a distance of 60 cm. and the exposed layer is wiped with a 5% solution of copper acetate and with greasy ink. Subsequently the image is developed by being wiped over with a 1% solution of phosphoric acid. The reverse image of the pattern is obtained on the metal base. This image can be used for printing after the printing plate has been placed in an offset printing machine.

(2) A solution of 2 parts of the diazo ketone of 2,4-dinitro-benzoic acid (Formula 12) in 100 parts by volume of glycol-monomethyl ether is applied, as described in Example 1, to a metal base. Then it is dried and exposed to light under a master. The exposed layer is developed by wiping with a 5% solution of phosphoric acid and the plate is inked with greasy ink. A 5% solution of copper acetate is applied simultaneously. Another wiping with a solution of phosphoric acid of possibly greater strength will cause the reverse image of the master pattern to appear clearly on the metal foil.

(3) An aluminum foil is coated and exposed to light, as indicated in Example 2, and the exposed layer is developed by being wiped with xylene to which 1% of benzyl chloride has been added. Subsequently, the foil is rubbed in with a solution of approximately 5% phosphoric acid and with greasy ink. A reverse image of the master pattern is obtained on the coated side of the base, which can be used for printing after being placed in a platen machine.

(4) An aluminum foil is coated in the manner described above with a solution of 2 parts of the diazo ketone of 4-methyl-3,5-dinitro-benzoic acid (Formula 13) in 100 parts by volume of glycol-monomethyl ether. After drying the layer is exposed under a master pattern for fifteen minutes to an 18-ampere arc lamp at a distance of 60 cm. The reverse image of the pattern is developed on the foil by wiping the latter with xylene, to which 1% of benzyl chloride is added, with a 5% solution of phosphoric acid and with greasy ink.

(5) The diazo ketone of 2-chloro-4-nitro-benzoic acid (Formula 11) is used for coating the aluminum foil; otherwise, the procedure described in Example 4 is followed.

(6) The procedure described in Example 4 is followed, with the diazo ketone of 3-nitro-anisic acid (Formula 10) as the light-sensitive compound.

(7) An aluminum foil is coated with a solution of 2 parts of the diazo ketone of 2-methyl-5-nitro-benzoic acid (Formula 9) in 100 parts by volume of glycol-monomethyl ether, and the dried layer is exposed under a pattern to an 18-ampere arc lamp. The exposed layer is developed by wiping with gasoline, 3% phosphoric acid and greasy ink. A reverse image of the master is obtained.

(8) An aluminum foil is coated with a solution of 2 parts of the diazo ketone of β-nitro-phthalic acid (Formula 14) in 100 parts by volume of glycol-monomethyl ether and after drying the light-sensitive layer is exposed behind a master to the light rays emitted from an 18-ampere arc lamp. The exposed layer is developed by wiping with xylene, to which 2% benzyl chloride is added and subsequently wiping with a 3% solution of phosphoric acid, and with greasy ink. A reverse image of the master pattern is thus obtained.

(9) The diazo ketone of nitro-terephthalic acid (Formula 15) is used as the light-sensitive compound, and the procedure described in Example 8 is followed.

(10) An aluminum foil is coated with a solution of 2 parts of azibenzil (Formula 26) in 100 parts by volume of glycol-monomethyl ether, and the dried layer is exposed to an arc lamp under a master pattern. The exposed foil is developed by rubbing with a 1% solution of phosphoric acid and with greasy ink. A reverse image of the master is thus obtained. It is also possible to develop the exposed foil by rubbing the coated side with a 5% solution of copper acetate and, subsequently, with a 1% solution of phosphoric acid and with greasy ink.

(11) An aluminum foil is coated with a solution of 2 parts of 4,4'-dinitro-azibenzil (Formula 27) in 100 parts by volume of glycol-monomethyl ether, and the dried layer is exposed to an arc lamp under a master pattern. The exposed layer is developed by wiping with carbon tetrachloride, a 3% solution of phosphoric acid, and greasy ink. A reverse image is thus obtained.

After having described and fully disclosed the present invention, what is claimed is:

1. A presensitized printing plate comprising a metal base material having a thin uniform coating thereon of a diazo ketone selected from the group consisting of

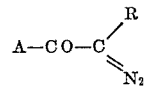

and

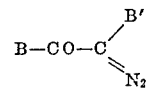

in which

A is selected from the group consisting of a monovalent aromatic radical having a fused aromatic ring, the valence of said radical being attached to a carbon atom of said aromatic ring, a five to six membered heterocyclic ring containing a conjugated system of double bonds, a free valence of the ring being attached to a carbon atom thereof, a phenyl radical bearing a monovalent primarily meta directing substituent, the valence of which is attached to an atom which is doubly bonded to oxygen and any hydrogen atoms of which are attached to an atom selected from the group consisting of carbon and nitrogen, and a phenyl radical having one of the aforementioned substituents and, in addition, a saturated primarily ortho-para directing group, R is selected from the group consisting of hydrogen and alkyl, and B and B' are monovalent aromatic radicals, the respective free valences of which are attached to benzene rings thereof.

2. A process for making a presensitized printing plate which comprises coating a metal base material with a thin uniform coating of a diazo ketone selected from the group consisting of

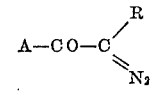

and

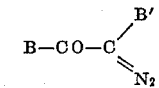

in which

A is selected from the group consisting of a monovalent aromatic radical having a fused aromatic ring, the valence of said radical being attached to a carbon atom of said aromatic ring, a five to six membered heterocyclic ring containing a conjugated system of double bonds, the free valence of the ring being attached to a carbon atom thereof, a phenyl radical bearing a monovalent primarily meta directing substituent, the valence of which is attached to an atom which is doubly bonded to oxygen and any hydrogen atoms of which are attached to an atom selected from the group consisting of carbon and nitrogen, and a phenyl radical having one of the aforementioned substituents and, in addition, a saturated primarily orthopara directing group, R is selected from the group consisting of hydrogen and alkyl, and B and B' are monovalent aromatic radicals, the respective free valences of which are attached to benzene rings thereof.

3. A process for developing a printing plate which comprises exposing to light under a master a metal base material having a thin uniform coating thereon of a diazo ketone selected from the group consisting of

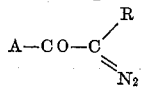

and

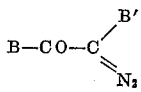

in which

A is selected from the group consisting of a monovalent aromatic radical having a fused aromatic ring, the valence of said radical being attached to a carbon atom of said aromatic ring, a five to six membered heterocyclic ring containing a conjugated system of double bonds, the free valence of the ring being attached to a carbon atom thereof, a phenyl radical bearing a monovalent primarily meta directing substituent, the valence of which is attached to an atom which is doubly bonded to oxygen and any hydrogen atoms of which are attached to an atom selected from the group consisting of carbon and nitrogen, and a phenyl radical having one of the aforementioned substituents and, in addition, a saturated primarily orthopara directing group, R is selected from the group consisting of hydrogen and alkyl, and B and B' are monovalent aromatic radicals, the respective free valences of which are attached to benzene rings thereof, and treating the light-exposed coating with a developer.

4. A presensitized printing plate comprising a metal base material having a thin uniform coating thereon of a compound having the formula $$R-CO-\overset{H}{\underset{}{C}}=N_2$$

in which R is an aryl radical.

5. A presensitized printing plate comprising a metal base material having a thin uniform coating thereon of a compound having the formula $$R-CO-\overset{R_1}{\underset{}{C}}=N_2$$

in which R and $R_1$ are aryl radicals.

6. A presensitized printing plate comprising a metal base material having a thin uniform coating thereon of a compound having the formula

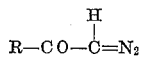

7. A presensitized printing plate comprising a metal base material having a thin uniform coating thereon of a compound having the formula

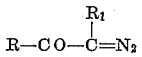

8. A presensitized printing plate comprising a metal base material having a thin uniform coating thereon of a compound having the formula

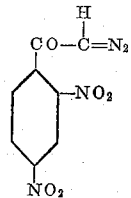

9. A presensitized printing plate comprising a metal base material having a thin uniform coating thereon of a compound having the formula

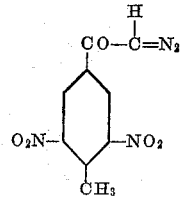

10. A presensitized printing plate comprising a metal base material having a thin uniform coating thereon of a compound having the formula

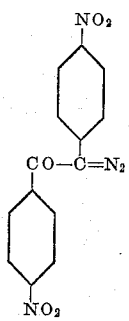

11. A presensitized printing plate comprising a metal base material having a thin uniform coating thereon of a compound having the formula

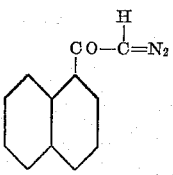

12. A presensitized printing plate comprising a base material having a thin uniform coating thereon of a metal compound having the formula

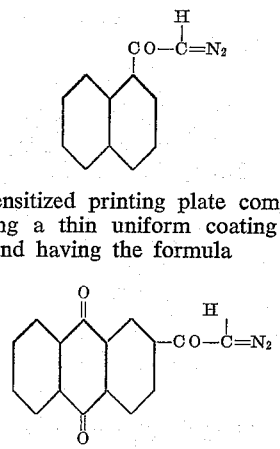

13. A presensitized printing plate comprising a base material having a thin uniform coating thereon of a metal compound having the formula

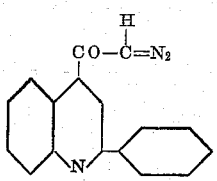

14. A presensitized printing plate comprising a base material having a thin uniform coating thereon of a metal compound having the formula

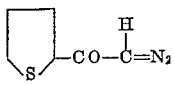

15. A presensitized printing plate comprising a base material having a thin uniform coating thereon of a metal compound having the formula

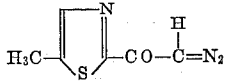

16. A presensitized printing plate comprising a base material having a thin uniform coating thereon of a metal compound having the formula

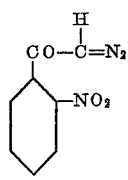

17. A presensitized printing plate comprising a base material having a thin uniform coating thereon of a metal compound having the formula

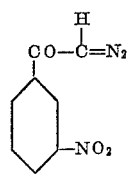

18. A presensitized printing plate comprising a base material having a thin uniform coating thereon of a metal compound having the formula

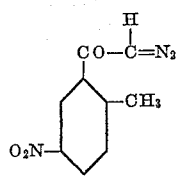

19. A presensitized printing plate comprising a base material having a thin uniform coating thereon of a metal compound having the formula

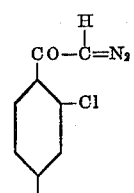

20. A presensitized printing plate comprising a base material having a thin uniform coating thereon of a metal compound having the formula

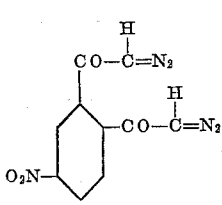

21. A presensitized printing plate comprising a base material having a thin uniform coating thereon of a metal compound having the formula

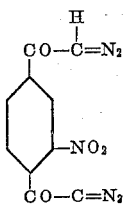

22. A presensitized printing plate comprising a base material having a thin uniform coating thereon of a metal compound having the formula

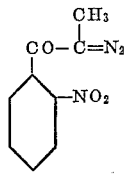

23. A presensitized printing plate comprising a base material having a thin uniform coating thereon of a metal compound having the formula

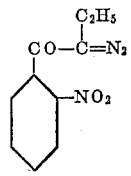

24. A presensitized printing plate comprising a base material having a thin uniform coating thereon of a metal compound having the formula

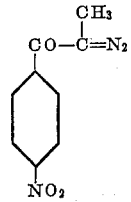

25. A presensitized printing plate comprising a base material having a thin uniform coating thereon of a metal compound having the formula

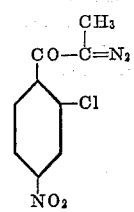

26. A presensitized printing plate comprising a base material having a thin uniform coating thereon of a metal compound having the formula

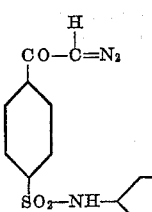

27. A presensitized printing plate comprising a base material having a thin uniform coating thereon of a metal compound having the formula

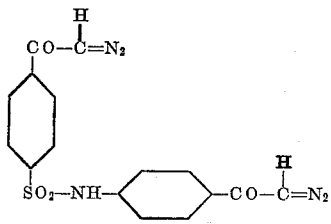

28. A presensitized printing plate comprising a base material having a thin uniform coating thereon of a metal compound having the formula

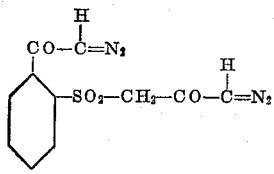

29. A presensitized printing plate comprising a base material having a thin uniform coating thereon of a metal compound having the formula

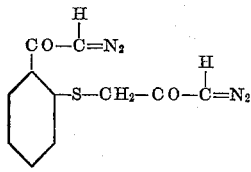

30. A presensitized printing plate comprising a base material having a thin uniform coating thereon of a metal compound having the formula

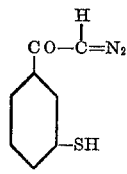

31. A presensitized printing plate comprising a base material having a thin uniform coating thereon of a metal compound having the formula

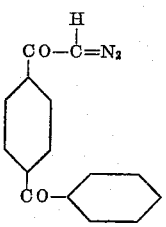

32. A presensitized printing plate comprising a base material having a thin uniform coating thereon of a metal compound having the formula

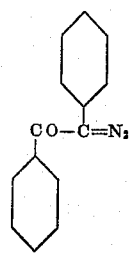

References Cited in the file of this patent
UNITED STATES PATENTS

| | | |
|---|---|---|
| 2,692,826 | Neugebauer et al. | Oct. 26, 1954 |
| 2,702,243 | Schmidt | Feb. 15, 1955 |
| 2,768,077 | Neugebauer et al. | Oct. 23, 1956 |
| 2,773,767 | Tomanek et al. | Dec. 11, 1956 |

FOREIGN PATENTS

| | | |
|---|---|---|
| 904,255 | France | Feb. 19, 1945 |

OTHER REFERENCES

Eistert: Zeitschrift fur angewandte chemie 1941, pages 99 and 124 to 127.

Curtius et al.: Journal fur practische chemie, vol. 44, 1891, pages 172 and 182.

Fuson: Advanced Organic Chemistry, John Wiley & Sons Pub., N.Y., pages 495 and 496, copyright 1950.

UNITED STATES PATENT OFFICE
CERTIFICATE OF CORRECTION

Patent No. 2,959,482 November 8, 1960

Wilhelm Neugebauer et al.

It is hereby certified that error appears in the printed specification of the above numbered patent requiring correction and that the said Letters Patent should read as corrected below.

Columns 14 through 18, claims 12 to 32 inclusive, line 3, strike out "metal", each occurrence, and insert the same after "comprising a", in line 1 of each of said claims.

Signed and sealed this 25th day of April 1961.

(SEAL)
Attest:
ERNEST W. SWIDER
Attesting Officer

DAVID L. LADD
Commissioner of Patents